United States Patent
Pautis et al.

(10) Patent No.: US 9,889,942 B2
(45) Date of Patent: Feb. 13, 2018

(54) AIRCRAFT ASSEMBLY COMPRISING A MOUNTING PYLON PRIMARY STRUCTURE INTEGRATED TO THE STRUCTURE OF THE WING ELEMENT

(71) Applicant: AIRBUS OPERATIONS (S.A.S.), Toulouse (FR)

(72) Inventors: Olivier Pautis, Merville (FR); Wolfgang Brochard, Toulouse (FR)

(73) Assignee: Airbus Operations (S.A.S.), Toulouse (FR)

( * ) Notice: Subject to any disclaimer, the term of this patent is extended or adjusted under 35 U.S.C. 154(b) by 138 days.

(21) Appl. No.: 15/015,841

(22) Filed: Feb. 4, 2016

(65) Prior Publication Data
US 2016/0229545 A1 Aug. 11, 2016

(30) Foreign Application Priority Data
Feb. 6, 2015 (FR) .................................. 15 50955

(51) Int. Cl.
*B64D 27/12* (2006.01)
*B64C 3/18* (2006.01)
(Continued)

(52) U.S. Cl.
CPC .............. *B64D 27/12* (2013.01); *B64C 3/187* (2013.01); *B64D 27/26* (2013.01); *B64F 5/10* (2017.01)

(58) Field of Classification Search
CPC .. B64D 27/12; B64D 27/26; B64D 2027/264; B64D 2027/262; B64D 2027/266;
(Continued)

(56) References Cited

U.S. PATENT DOCUMENTS

| 8,474,750 B2 * | 7/2013 | Marche ................. | B64D 27/26 244/53 R |
| 2004/0094664 A1 * | 5/2004 | Harrison ................ | B64D 27/18 244/54 |

(Continued)

FOREIGN PATENT DOCUMENTS

| EP | 1 190 167 A1 | 4/2008 |
| FR | 2 931 133 A1 | 11/2009 |
| FR | 2 993 535 A1 | 1/2014 |

OTHER PUBLICATIONS

French Search Report for Application No. 1550955 dated Dec. 15, 2015.

*Primary Examiner* — Valentina Xavier
(74) *Attorney, Agent, or Firm* — Jenkins, Wilson, Taylor & Hunt, P.A.

(57) ABSTRACT

In order to optimize the bulk of a primary structure of an aircraft engine attachment pylon, and to favor the installation of the engine as close as possible to the wing element, the disclosure herein provides an aircraft assembly comprising a wing element, a turbofan engine and an engine attachment pylon, the engine comprising a rear part arranged under the wing element equipped with a wing structure, the pylon comprising a primary structure for transmitting loads from the engine to the wing structure, this primary structure comprising a pylon box, and the assembly also comprising an attachment for attaching the primary structure to the engine. According to the disclosure herein, the wing structure comprises two wing boxes that follow one another in a wingspan direction of the wing element, and the pylon box is arranged between these boxes and fixed to each of the latter.

15 Claims, 6 Drawing Sheets

(51) Int. Cl.
*B64D 27/26* (2006.01)
*B64F 5/10* (2017.01)

(58) Field of Classification Search
CPC ........... B64D 29/06; B64D 27/00; B64F 5/10; B64C 3/187
See application file for complete search history.

(56) References Cited

U.S. PATENT DOCUMENTS

| 2005/0082423 | A1* | 4/2005 | Whitmer | B64D 27/18 244/54 |
| 2011/0116528 | A1* | 5/2011 | Davies | G01N 25/72 374/46 |
| 2016/0244158 | A1* | 8/2016 | Fredericks | B64C 25/52 |

* cited by examiner

AIRCRAFT ASSEMBLY COMPRISING A MOUNTING PYLON PRIMARY STRUCTURE INTEGRATED TO THE STRUCTURE OF THE WING ELEMENT

CROSS-REFERENCE TO RELATED APPLICATION

This application claims priority to FR 15 50955 filed Feb. 6, 2015, the entire disclosure of which is incorporated by reference herein.

TECHNICAL FIELD

The present disclosure relates to the field of aircraft assemblies comprising a wing element, a turbofan engine and an engine attachment pylon, the latter being intended to be arranged in part under the wing element.

The disclosure herein also relates to an aircraft equipped with such an assembly. It applies preferably to commercial aeroplanes.

BACKGROUND

In existing aircraft, the turbofan engines such as turbojet engines are suspended beneath the wing by complex attachment devices, also known as "EMS" (for "Engine Mounting Structure"), or attachment pylons. The attachment devices conventionally used have a primary structure, also known as rigid structure, that is frequently produced in the form of a single box, that is to say is made up of the assembly of lower and upper spars that are connected together by a plurality of transverse ribs situated inside the box. The spars are arranged on lower and upper faces, while lateral panels close the lateral faces of the box. In addition, the attachment pylon is arranged in the upper part of the engine, between the latter and the wing box. This position is known as the "12 o'clock" position.

As is known, the primary structure of these pylons is designed to allow the static and dynamic loads generated by the engines, such as the weight, the thrust, or even the various dynamic loads, in particular those associated with cases of failure such as: loss of blades (FBO), collapse of the front landing gear, hard landing, etc. to be transmitted to the wing.

In attachment pylons known from the prior art, the transmission of loads between its primary structure, known in the form of a single box, and the wing is conventionally ensured by a set of mounts comprising a front mount, a rear mount, and an intermediate mount intended in particular to react thrust loads generated by the engine.

In recent turbofan engines, the high bypass ratio that is desired has resulted in extremely high bulk, since an increase in the bypass ratio inevitably causes an increase in the diameter of the engine, and more particularly an increase in the diameter of its fan casing.

Thus, with a ground clearance which is fixed so as to remain acceptable from a safety point of view, the space remaining between the wing element and the engine becomes increasingly small, or even non-existent for engines with a high bypass ratio. As a result, it can prove difficult to install the attachment pylon and the various wing mounts in this remaining vertical space that is usually devoted to this installation.

The evolution of turbofan engines has therefore had the detrimental effect of imposing a reduction in the vertical dimensions of the attachment pylon, in particular so as to be able to preserve enough space to fit the mount fittings. The large dimensions of some mounts are necessitated by the need to react the engine thrust loads, that is to say those oriented in the longitudinal direction of this engine, and those oriented in the transverse direction thereof. By way of indication, it is recalled that the longitudinal direction of the engine corresponds to the direction of the main axis of rotation of the propulsion system.

However, the options for reducing the vertical dimensions of the attachment pylon are limited. Specifically, the rigid structure of this pylon, also known as primary structure, needs to have sufficient dimensions to afford mechanical strength capable of withstanding the transmission of loads from the engine to the wing element, with small deformation under stress in order not to impair the aerodynamic performance of the propulsion system.

In the prior art, multiple solutions have been proposed for bringing the engine as close as possible to the wing element from which it is suspended, this being in order to maintain the required ground clearance, in particular with regard to the risks of ingestion and collision, also known as the FOD (Foreign Object Damage) risk. Nevertheless, these solutions need to be constantly improved upon in order to adapt to the increasingly high diameters of fan casing adopted in order to meet bypass ratio requirements.

SUMMARY

It is therefore an object of the disclosure herein to provide an assembly for an aircraft that at least partially overcomes the abovementioned problems that are encountered in the prior art solutions.

To this end, one subject of the disclosure herein is an aircraft assembly comprising a wing element, a turbofan engine and an engine attachment pylon, the engine comprising a rear part arranged under the wing element, which is equipped with a wing structure, the pylon comprising a primary structure for transmitting loads from the engine to the wing structure, the primary structure comprising a pylon box, and the assembly also comprising an attachment for attaching the primary structure to the engine.

According to the disclosure herein, the wing structure comprises two wing boxes that follow one another in a wingspan direction of the wing element, and the pylon box is arranged between the wing boxes and fixed to each of the latter.

Therefore, the disclosure herein breaks with the existing solutions by installing the pylon box directly within the wing structure, the latter then being divided into two boxes arranged on either side of the attachment pylon. The solution that is specific to the disclosure herein makes it possible to obtain an excellent compromise in terms of bulk, simplicity of design, and capacity to bring the engine as close as possible to the wing element.

Specifically, the bulk is reduced in that the primary structure of the pylon no longer requires multiple structural elements. The integration of the pylon box into the wing structure also helps to reduce this bulk, and also the quantity and mass of the secondary structures to be fitted on the pylon. By virtue of this reduction in pylon bulk, the installation of surrounding elements is rendered easier by the design specific to the disclosure herein. By way of example, the nacelle and its thrust reverser system can sit as close as possible to the engine casing since it is not impeded by the presence of the connecting bows and side beams, as it was in document FR 2 993 535. Furthermore, systems can be integrated more easily into the pylon, around the pylon box.

Moreover, the design is simplified, in particular since the presence of conventional wing mounts is no longer required, the fixing of the pylon to the wing element now being carried out more simply, by connecting the various boxes together.

Finally, the integration of the pylon box into the wing structure makes it possible to bring the engine as close as possible to the wing element, thereby ensuring a satisfactory ground clearance, even with engines that have high bypass ratios.

Preferably, the disclosure herein also has at least one of the following optional technical features, taken individually or in combination.

The two wing boxes form an internal box and an external box, the internal box being delimited by an external lateral panel and the external box being delimited by an internal lateral panel, the pylon box being delimited by an external lateral panel and by an internal lateral panel, and the assembly has a first mechanical connection between the external lateral panel of the internal wing box and the internal lateral panel of the pylon box, and also a second mechanical connection between the internal lateral panel of the external wing box and the external lateral panel of the pylon box.

The external lateral panel of the internal wing box is pressed against the internal lateral panel of the pylon box, and the internal lateral panel of the external wing box is pressed against the external lateral panel of the pylon box.

The first and second mechanical connections are each produced by shear pins and/or bolts, the shear pins and/or bolts preferably having axes substantially parallel to the wingspan direction.

The pylon box and the internal and external wing boxes are each delimited by lower spars and upper spars, the lower spars of the pylon box ensuring surface continuity between the lower spars of the internal and external wing boxes, and the upper spars of the pylon box ensuring surface continuity between the upper spars of the internal and external wing boxes. Alternatively, breaks in surface continuity can be provided when the pylon box has a height greater than those of the wing boxes.

The pylon box has internal transverse box stiffening ribs.

The pylon box extends forwards beyond the internal and external wing boxes. Likewise, it can extend beyond the leading edge of the wing element.

The pylon box and the internal and external wing boxes are each delimited by a rear closing rib, the rear closing rib of the pylon box ensuring surface continuity between the rear closing ribs of the internal and external wing boxes. Alternatively a break in surface continuity can be provided when the pylon box extends rearwards beyond the wing boxes.

The pylon box has a cross section in the overall shape of a quadrilateral, preferably square or rectangular, the cross section having a changing size along the pylon box.

The primary structure also has an intermediate structure interposed between the pylon box and the attachment for attaching the primary structure to the engine, the intermediate structure taking the form of a fitting, preferably having the overall shape of a pyramid.

The pylon box bears, at its front end, a part of the attachment for attaching the primary structure to the engine.

A front part of the attachment for attaching the primary structure to the engine is connected to an external shroud of an intermediate casing of the engine, this external shroud extending in the rearward axial continuation of a fan casing, or, in an alternative embodiment, this front part of the attachment for attaching the primary structure to the engine is connected to an internal shroud of the intermediate casing of the engine.

A further subject of the disclosure herein is a method for mounting an assembly according to the disclosure herein, and comprising the following successive steps of:

a) fixing at least one part of the pylon box to the internal wing box; and then b) fixing the external wing box to the at least one part of the pylon box.

Preferably, the pylon box is delimited by upper spars mounted on the assembly after step b) above.

Finally, a further subject of the disclosure herein is an aircraft comprising at least one such assembly. In this regard, it is noted that when a wing element is equipped with two engines, it then has three wing boxes that follow one another in the wingspan direction, the two attachment pylons associated with the two engines then each being housed between two directly consecutive wing boxes.

Further advantages and features of the disclosure herein will become apparent from the following non-limiting detailed description.

BRIEF DESCRIPTION OF THE DRAWINGS

This description will be given with reference to the appended drawings, in which.

DETAILED DESCRIPTION

Figure 1:
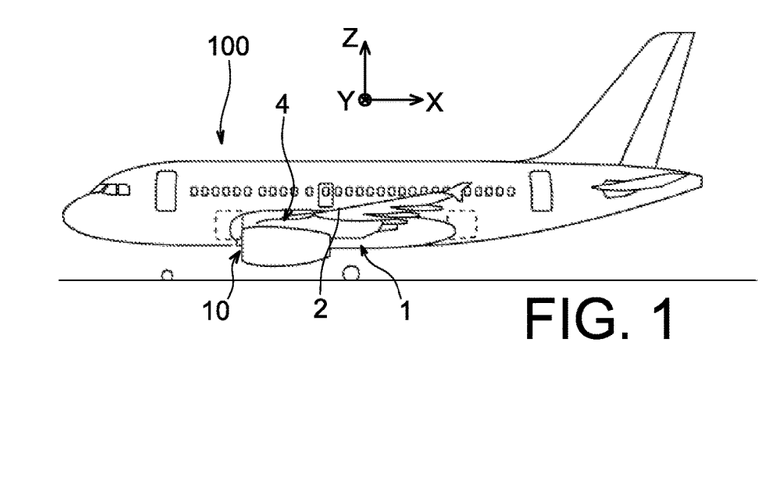
FIG. 1 shows a side view of an aircraft comprising an assembly according to the disclosure herein.

With reference first of all to FIG. 1, an aircraft 100 comprising one or more assemblies 1 according to a preferred embodiment of the disclosure herein is shown. Overall, this assembly 1 comprises a wing element 2 corresponding to a wing of the aircraft, a turbofan engine 10 such as a turbojet engine surrounded by a nacelle, and an attachment pylon 4 for the engine 10.

Figure 2:
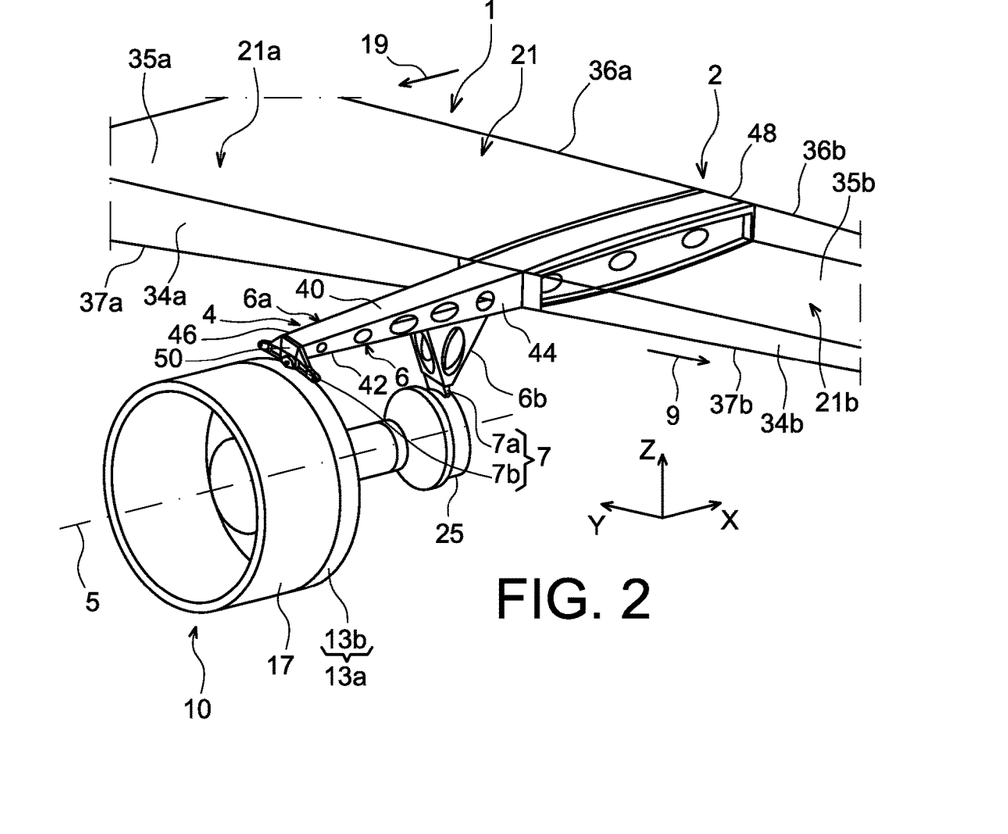
FIG. 2 shows a cleaned-up perspective view of the assembly with which the aircraft shown in the preceding figure is equipped.
Figure 3:
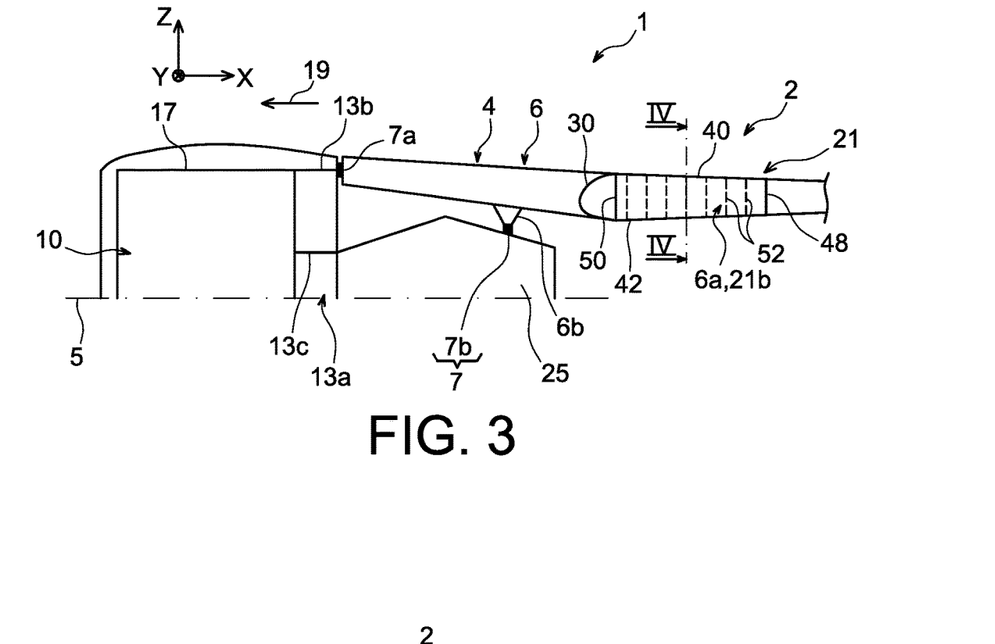
FIG. 3 shows a schematic side view of the assembly shown in FIG. 2.
Figure 4:
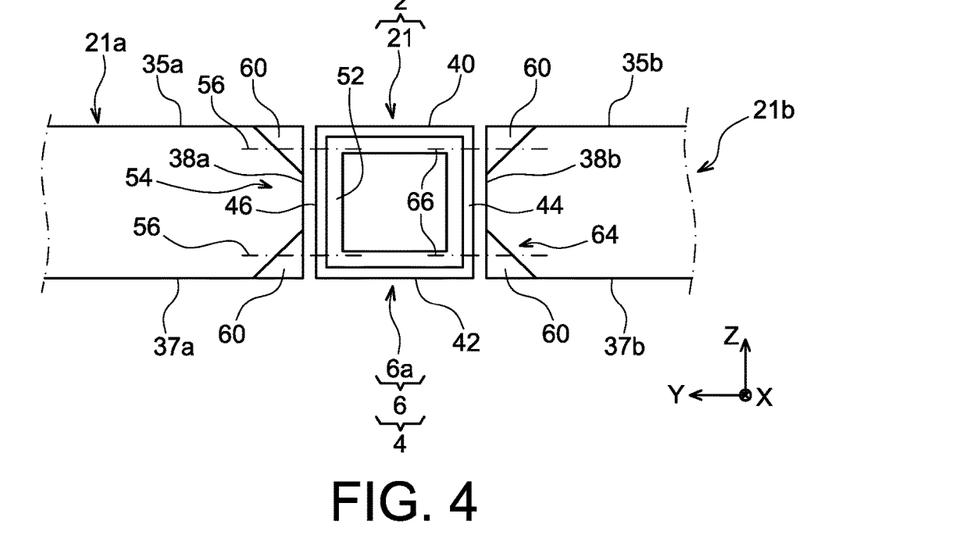
FIG. 4 shows a cross-sectional view taken along the line IV-IV in FIG. 3.

With reference to FIGS. 2 through 4, the assembly 1 is shown according to a first preferred embodiment of the present disclosure.

Overall, this assembly 1 comprises a wing element 2 corresponding to a wing of the aircraft, a turbofan engine 10 such as a turbojet engine, and an attachment pylon 4 for the engine 10. Moreover, the assembly 1 has attachment 7 for attaching the turbojet engine 10 to a primary structure 6 of the pylon 4.

Throughout the following description, by convention, the direction X corresponds to the longitudinal direction of the pylon 4, which can also be likened to the longitudinal direction of the turbojet engine 10 and of the assembly 1. This direction X is parallel to a longitudinal axis 5 of this turbojet engine 10. On the other hand, the direction Y corresponds to the direction oriented transversely to the pylon 4 and can also be likened to the transverse direction of the turbojet engine 10, whereas the direction Z corresponds to the vertical or heightwise direction. These three directions X, Y and Z are orthogonal to one another and form a direct trihedron.

Furthermore, the terms "front" and "rear" should be considered with respect to a direction of travel of the aircraft which direction is encountered as a result of the thrust exerted by the turbojet engines 10, this direction of travel being represented schematically by the arrow 19.

The wing 2 has a wing structure 21 extending in a wingspan direction 9 of the wing 2, which is oriented substantially parallel to the above-described direction Y. This structure 21 is intended to form the structural part of the wing. In this case, it has a particular design, being segmented into two wing boxes, specifically an internal wing box 21a and an external wing box 21b. The internal box 21a is situated on the inner side of the wing, that is to say it is arranged closer to the fuselage than the external box 21b. In accordance with the disclosure herein, the wing structure 21 is also equipped with a pylon box arranged between the two wing boxes 21a, 21b, as will be described in detail below.

The internal wing box 21a is delimited at the front by a front spar 34a and delimited at the rear by a rear spar 36a, also known as a closing rib. The two spars 34a, 36a, which extend substantially through the full thickness of the wing, are conventionally oriented in the wingspan direction 9. Moreover, the box 21a is closed at the top by the upper surface part of the wing, with the aid of upper spars 34a, also known as the "inner wing box upper panel". Similarly, the box 21a is closed at the bottom by the lower surface part of this same wing, with the aid of lower spars 37a, also known as the "inner wing box lower panel". The spars 34a, 36a are fixed internally to the spars 35a, 37a, which form the aerodynamic surfaces of the wing. Moreover, the internal box 21a is delimited by an external lateral panel 38a, also known as a "joining rib", extending over the entire cross section of this box 21a. Here and in the rest of the description, in order to define certain constituent elements of each box, reference is made to "spars", given that each element in question can in fact be obtained with the aid of a plurality of spars that are joined together, in the continuity of one another. However, each constituent element of the boxes may alternatively be obtained with the aid of a single spar produced in one piece, without departing from the scope of the disclosure herein.

The external wing box 21b has a similar design to that of the internal wing box 21a, while adopting smaller dimensions. Consequently, this box 21b will not be described further, apart from the fact that it is delimited by an internal lateral panel 38b, also known as a "joining rib", this panel 38b being oriented in the direction of the box 21a. In the figures, those elements of the box 21b that are similar to those of the box 21a each bear the same reference numerals, with the extension "b" replacing the extension "a".

In FIGS. 2 to 4, only the primary structure 6 of the attachment pylon 4 has been shown, accompanied by the abovementioned attachment 7. The other constituent elements of this pylon 4 that are not shown, of the secondary structure type that segregates and holds the systems while supporting the aerodynamic fairings, are conventional elements similar to those encountered in the prior art. Consequently, a detailed description thereof will not be given.

The primary structure 6, or rigid structure, allows static and dynamic loads brought about by the turbojet engine 10 to be transmitted to the wing structure 21. It has, as main element, a pylon box 6a that extends along the entire length of the primary structure 6 in the direction X. The pylon box 6a has a conventional design, namely is delimited at the top by upper spars 40, at the bottom by lower spars 42, laterally by an external lateral panel 44 and an internal lateral panel 46, at the rear by a rear closing rib 48, and at the front by a front closing rib 50. By way of indication, it is noted that the upper spars 40 are also known as "pylon box upper panel" and the lower spars 42 are also known as "pylon box lower panel". In addition, the lateral panels 44, 46 are also known as "joining ribs".

Moreover, the pylon box 6a is equipped with internal transverse stiffening ribs 52, which are preferably hollow and parallel to the box closing ribs 48, 50, and are thus preferably arranged in the planes YZ and are distributed uniformly in the direction X. This box 6a has a cross section YZ in the overall shape of a square or rectangle, having a changing size in the direction X. This cross section can remain substantially constant in the rear part situated at the wing structure 21, but then narrows towards the front, as far as its front end carrying a front engine mount 7a. This front engine mount 7a is connected to an external shroud 13b of an intermediate casing 13a of the turbojet engine 10. This shroud 13b extends in the rearward axial continuation of a fan casing 17, more or less with the same diameter. Alternatively, the front engine mount 7a could be connected to an internal shroud 13c of the intermediate casing 13a, without departing from the scope of the disclosure herein.

Moreover, the attachment 7 comprises a rear engine mount 7b carried by an intermediate structure 6b of the primary structure 6. This intermediate structure 6b is a fitting in the overall shape of a pyramid, projecting downwards from the lower spars 42 of the pylon box 6a. The intermediate structure 6b is arranged in front of the leading edge 30 of the wing, and narrows cross-sectionally downwards. At its bottom end, it carries the rear engine mount 7b, which is also connected to a turbine casing 25 of the turbojet engine.

Moreover, the attachment 7 comprises link rods 7c for reacting thrust loads. There are two of these link rods, one of which has been schematically shown in FIG. 3, and they are connected at the front, independently and symmetrically on either side of the axis X, to the internal shroud 13c of the intermediate casing 13a. At the rear, the link rods 7c are concurrent and connected to the fitting 6b of the rear engine mount 7b, generally via a yoke hinged to this fitting 6b. This arrangement constitutes what is commonly known as the thrust path.

Here, the attachment 7 is formed only by the abovementioned elements 7a, 7b and 7c, which together form a load-reacting statically determinate system. By virtue of this statically determinate load reacting, which are arranged in two separate planes that are offset with respect to one another in the direction X, the operations of fitting/removing the engine are rendered easier and deformations of the engine are reduced, thereby enhancing the overall performance of the engine.

As indicated above, one of the particular features of the disclosure herein is that the rear part of the pylon box 6a is integrated into the wing structure 21. It is interposed between the two wing boxes 21a, 21b in the wingspan direction 9, while the front part of this pylon box 6a protrudes forward beyond the leading edge 30 of the wing. In other words, the rear part of the pylon box 6a is arranged between the two wing boxes 21a, 21b and fixed to each of the latter in a way which will now be described in detail with reference to FIG. 4.

The three boxes 6a, 21a, 21b are fixed by way of their lateral panels 44, 46, 38a, 38b that are pressed together in pairs.

First of all, a first mechanical connection 54 is provided between the lateral panels 38a, 46. It is realized with the aid of shear pins and/or bolts having axes 56 substantially parallel to the wingspan direction 9. The shear pins/bolts are for example distributed along a first line and a second line of direction X, the first being situated close to a top end of the panels 38a, 46 while the second line is arranged close to a bottom end of these same panels. As a result of the line-wise distribution of the pins/bolts of which they are made up, these mechanical connections are conventionally referred to as a "piano connection".

In order to reinforce the connection 54, a longitudinal bracket 60 can be associated with each line, being passed through by the pins/bolts and situated inside the box 21a.

Similarly, a second mechanical connection 64 is provided between the lateral panels 38b, 44. It is realized with the aid of shear pins and/or bolts having axes 66 substantially parallel to the wingspan direction 9. The shear pins/bolts are distributed along a first line and a second line of direction X, the first being situated close to a top end of the panels 38b, 44 while the second line is arranged close to a bottom end of these same panels. In order to reinforce the connection 64, a longitudinal bracket 60 can be associated with each of the two lines, being passed through by the pins/bolts and situated inside the box 21b.

In this first preferred embodiment, the rear part of the pylon box 6a reconstructs the wing structure 21 between the two boxes 21a, 21b so as to obtain surface continuity between the upper spars 35a, 35b, via the upper spars 40 of the pylon box 6a. Surface continuity is likewise obtained between the lower spars 37a, 37b by way of the lower spars 42 of the pylon box 6a. Finally, surface continuity is also ensured between the rear closing ribs 36a, 36b of the wing boxes, by the rear closing rib 48 of the pylon box 6a. In other words, the pylon box 6a will fill the space between the two wing boxes 21a, 21b so as to obtain a wing structure 21 having an external geometry identical or similar to that of a single wing box, as encountered in the prior art.

Figure 6:
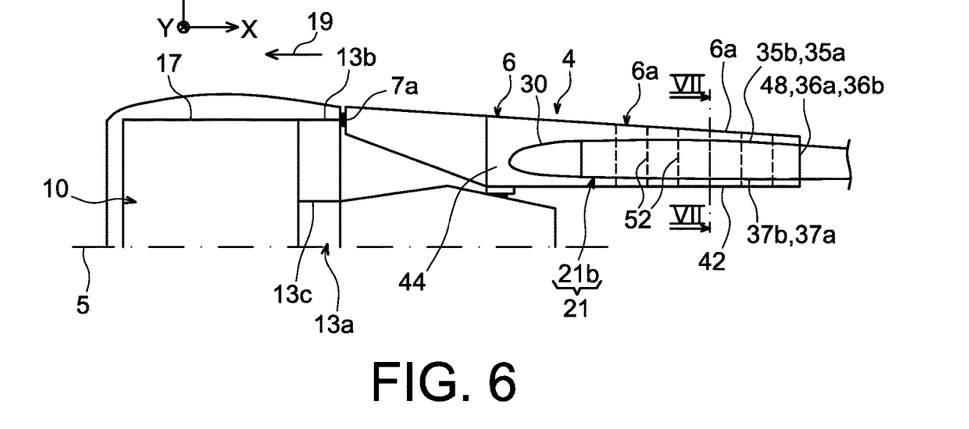
FIG. 6 shows a schematic side view similar to the one in FIG. 3, with the assembly in the form of a second preferred embodiment.
Figure 7:
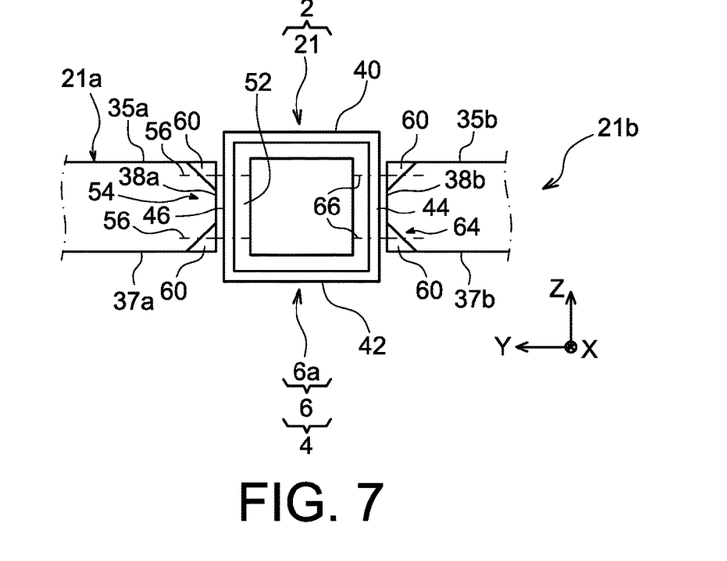
FIG. 7 shows a cross-sectional view taken along the line VII-VII in FIG. 6.

In a second preferred embodiment, which is shown schematically in FIGS. 6 and 7, only the continuity of the surfaces 36a, 48, 36b at the rear of the boxes 6a, 21a, 21b is preserved. On the other hand, the pylon box 6a has a cross section with a size larger than that of the wing boxes 21a, 21b, entailing a break in surface continuity at the upper spars 35a, 35b, 40, and also a break in surface continuity at the lower spars 37a, 37b, 42. In this regard, it is noted that the portions of the box 6a projecting upwards and downwards from the wing structure 21 are preferably equipped with aerodynamic fairings (not shown) that form an integral part of the secondary structures of the pylon 4.

Various successive steps in a method according to the disclosure herein for mounting the above-described assembly 1 are now shown with reference to FIGS. 5a through 5e. Overall, the boxes 21a, 6a and 21b are mounted successively so as to progressively reconstruct the wing structure 21, starting from the inside of the latter.

Figure 5A:
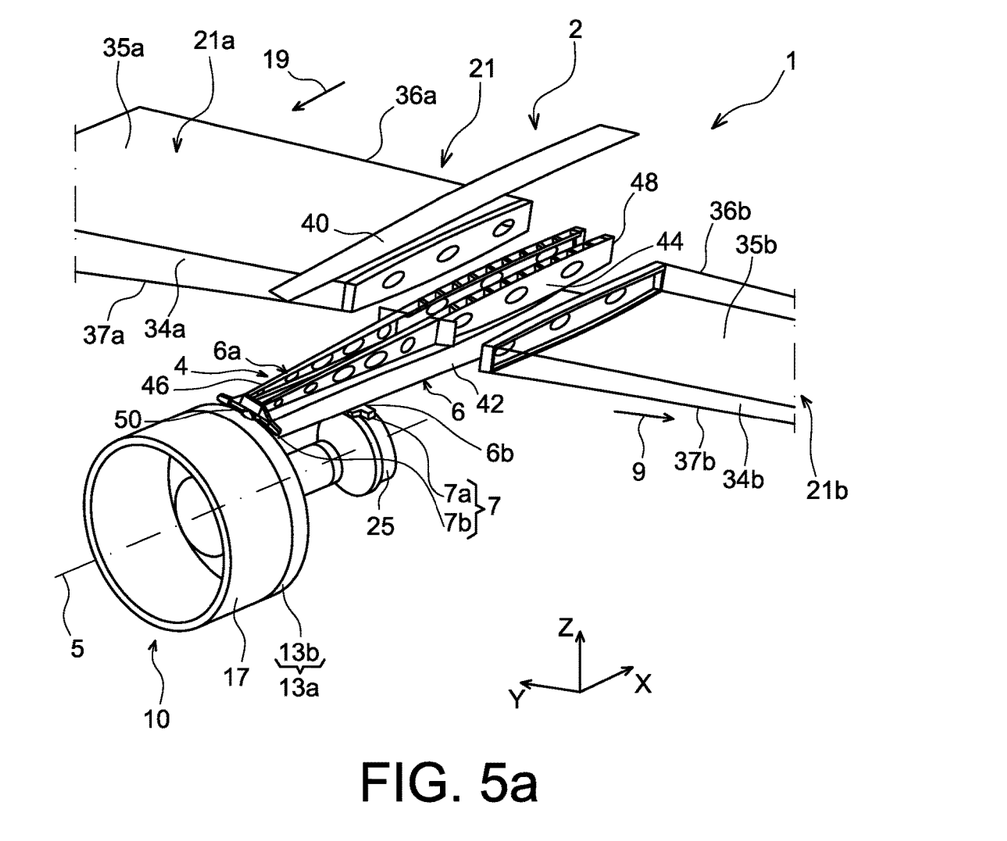
FIGS. 5*a* through 5*e* schematically show a method for mounting the assembly shown in the preceding figures.
Figure 5B:
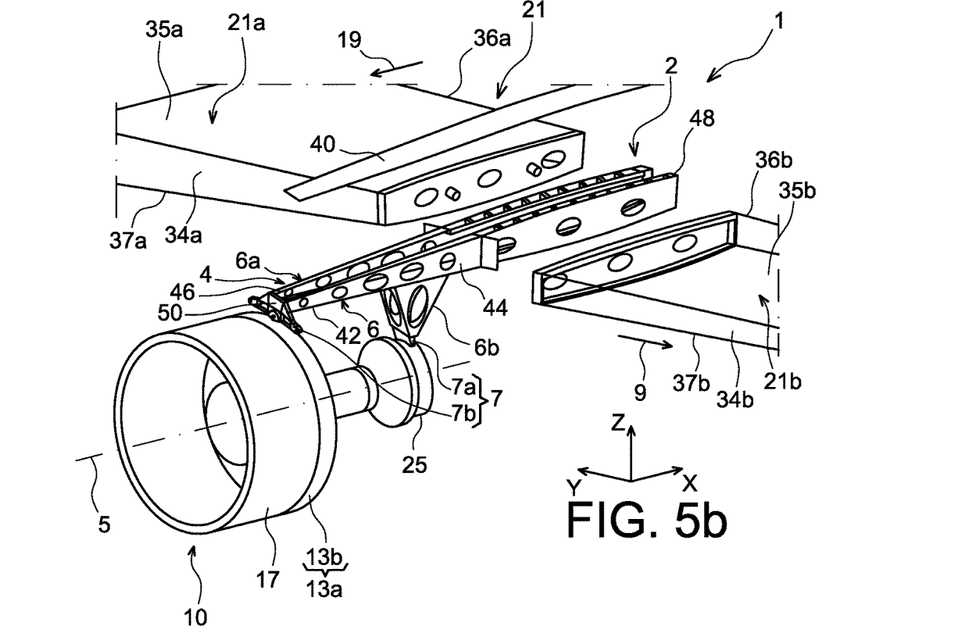
Figure 5C:
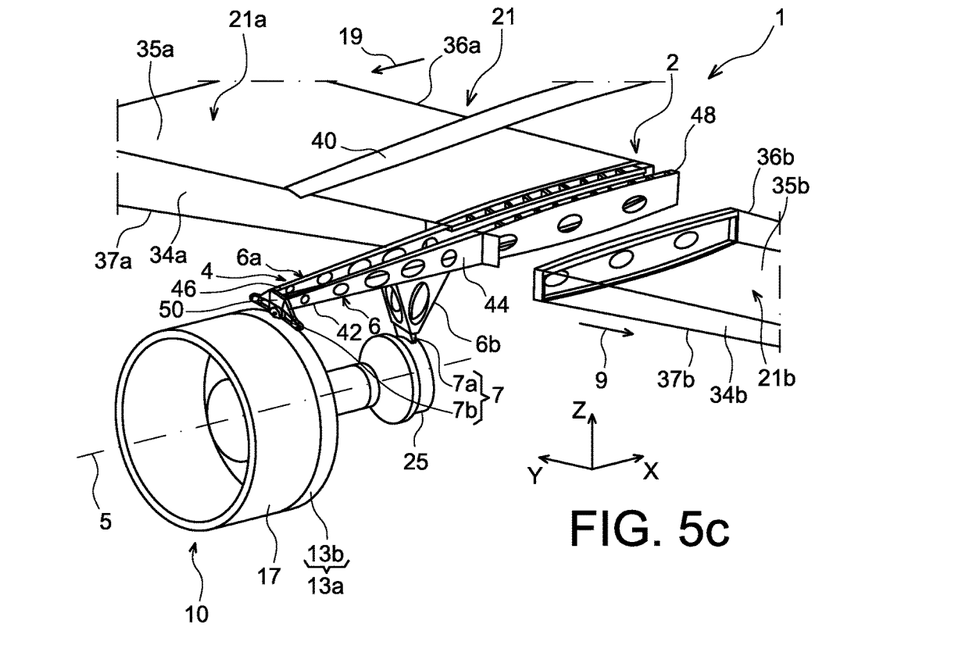
Figure 5D:
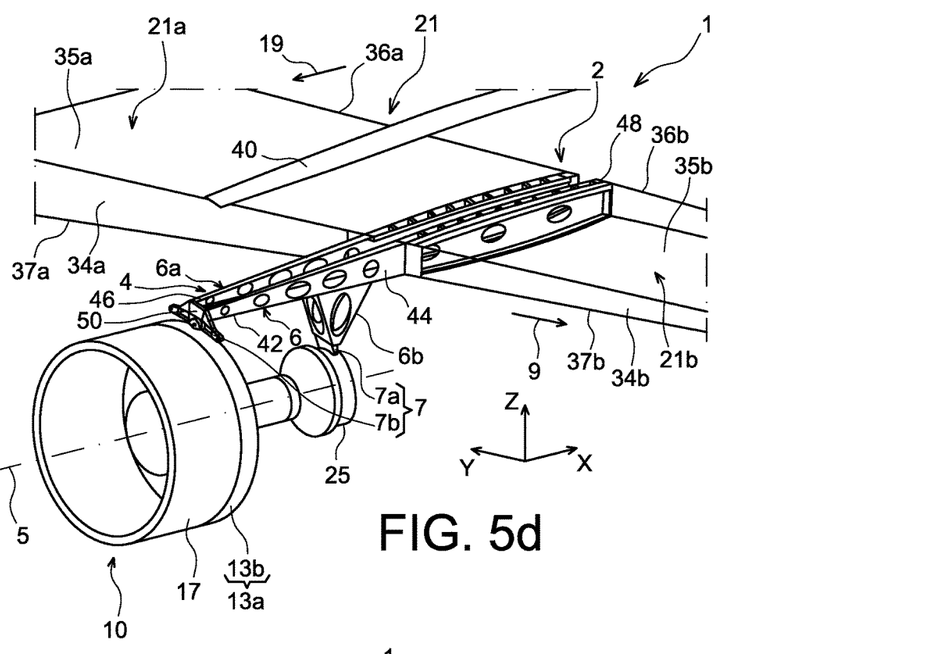

First of all, as shown in FIGS. 5a and 5b, the pylon box 6a is produced by assembling the lateral panels 44, 46, the lower ribs (not shown) and the lower spars 42. On the other hand, the upper spars 40 have not yet been assembled at this stage, so as to leave easy access to the interior of the box 6a, so that it is easier to fix the latter to the internal wing box 21a, as shown schematically in FIG. 5c, and then to allow the external box 21b to be fixed to this pylon box 6a, as shown schematically in FIG. 5d. These two fixtures, which are produced from the inside of the pylon box 6a that has been left open, are obtained via the first and second abovementioned connections, employing shear pins and/or bolts.

Figure 5E:
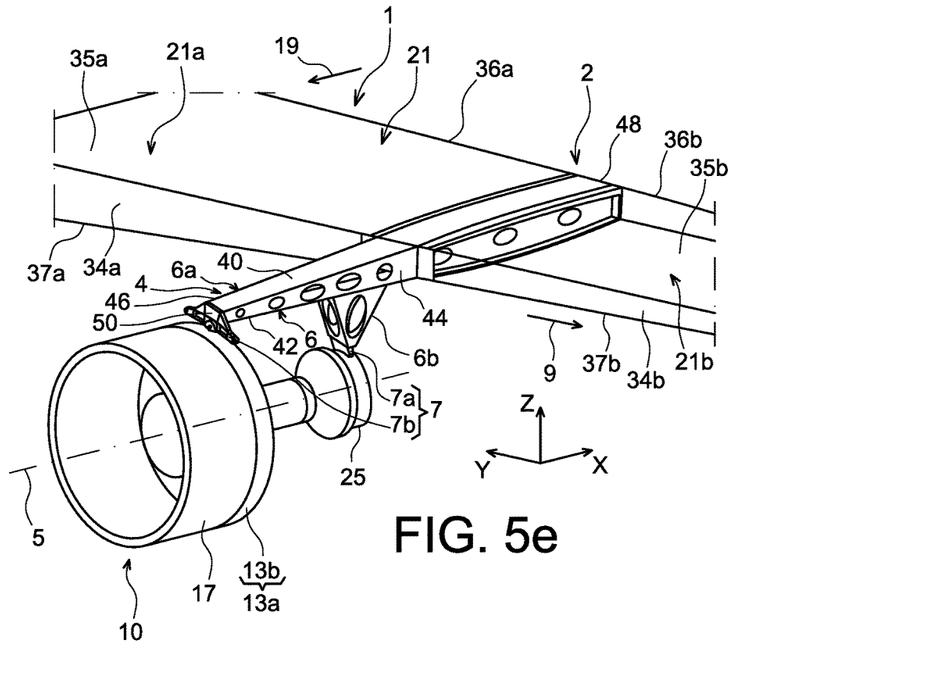

Finally, the upper spars 40 are fixed to the lower transverse ribs of the box 6a, so as to close the latter, as shown schematically in FIG. 6e.

Of course, various modifications can be made by a person skilled in the art to the aircraft assemblies 1 which have just been described, purely by way of non-limiting examples.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. An aircraft assembly comprising a wing element, a turbofan engine and an engine attachment pylon, the engine comprising a rear part arranged under the wing element, which is equipped with a wing structure, the pylon comprising a primary structure for transmitting loads from the engine to the wing structure, the primary structure comprising a pylon box, and the assembly also comprising an attachment for attaching the primary structure to the engine, the wing structure comprising two wing boxes that follow one another in a wingspan direction of the wing element, and the pylon box being arranged between the wing boxes and fixed to each of the latter.

2. The assembly according to claim 1, wherein the two wing boxes form an internal box and an external box, the internal box being delimited by an external lateral panel and the external box being delimited by an internal lateral panel, the pylon box being delimited by an external lateral panel and by an internal lateral panel, and wherein it has a first mechanical connection between the external lateral panel of the internal wing box and the internal lateral panel of the pylon box, and also a second mechanical connection between the internal lateral panel of the external wing box and the external lateral panel of the pylon box.

3. The assembly according to claim 2, wherein the external lateral panel of the internal wing box is pressed against the internal lateral panel of the pylon box, and in that the internal lateral panel of the external wing box is pressed against the external lateral panel of the pylon box.

4. The assembly according to claim 2, wherein the first and second mechanical connections are each produced by shear pins and/or bolts, the shear pins and/or bolts preferably having axes substantially parallel to the wingspan direction.

5. The assembly according to claim 2, wherein the pylon box and the internal and external wing boxes are each delimited by lower spars and upper spars, the lower spars of the pylon box ensuring surface continuity between the lower spars of the internal and external wing boxes, and the upper spars of the pylon box ensuring surface continuity between the upper spars of the internal and external wing boxes.

6. The assembly according to claim 1, wherein the pylon box has internal transverse box stiffening ribs.

7. The assembly according to claim 1, wherein the pylon box extends forwards beyond the internal and external wing boxes.

8. The assembly according to claim 2, wherein the pylon box and the internal and external wing boxes are each delimited by a rear closing rib, the rear closing rib of the pylon box ensuring surface continuity between the rear closing ribs of the internal and external wing boxes.

9. The assembly according to claim 1, wherein the pylon box has a cross section in the overall shape of a quadrilateral, preferably square or rectangular, the cross section having a changing size along the pylon box.

10. The assembly according to claim 1, wherein the primary structure also has an intermediate structure interposed between the pylon box and the attachment for attaching the primary structure to the engine, the intermediate structure taking the form of a fitting, preferably having the overall shape of a pyramid.

11. The assembly according to claim 1, wherein the pylon box bears, at its front end, a part of the attachment for attaching the primary structure to the engine.

12. The assembly according to claim 1, wherein a front part of the attachment for attaching the primary structure to the engine is connected to an external shroud of an intermediate casing of the engine, this external shroud extending in the rearward axial continuation of a fan casing, or in that this front part of the attachment for attaching the primary structure to the engine is connected to an internal shroud of the intermediate casing of the engine.

13. A method for mounting an assembly according to claim 1, comprising the following successive steps of:

a) fixing at least one part of the pylon box to an internal wing box; and then b) fixing an external wing box to the at least one part of the pylon box.

14. The mounting method according to claim 13, wherein the pylon box is delimited by upper spars mounted on the assembly after step b).

15. An aircraft comprising at least one assembly according to claim 1.

* * * * *